Sept. 23, 1941.  K. T. GREENWOOD  2,256,899
REEL-SUPPORTING MEANS FOR MOTION PICTURE PROJECTORS
Filed Dec. 26, 1939  2 Sheets-Sheet 1
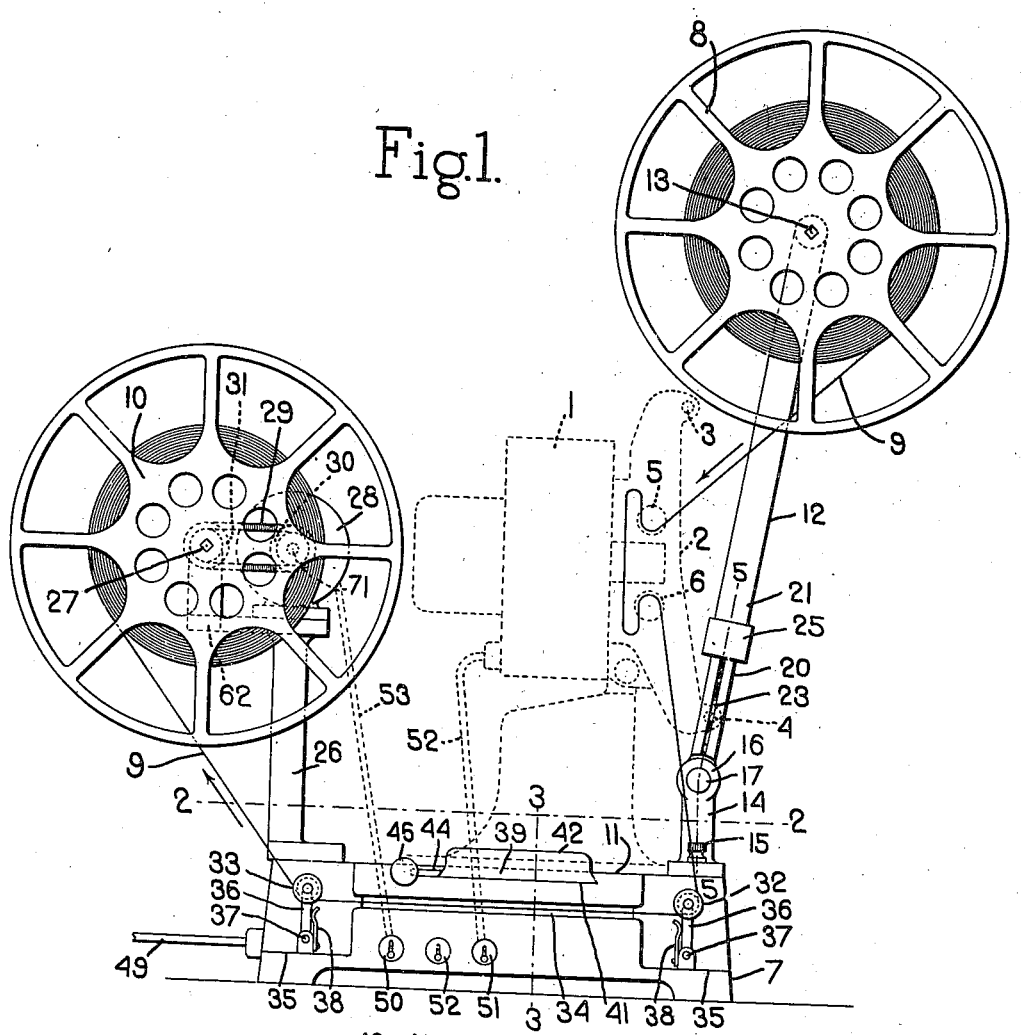
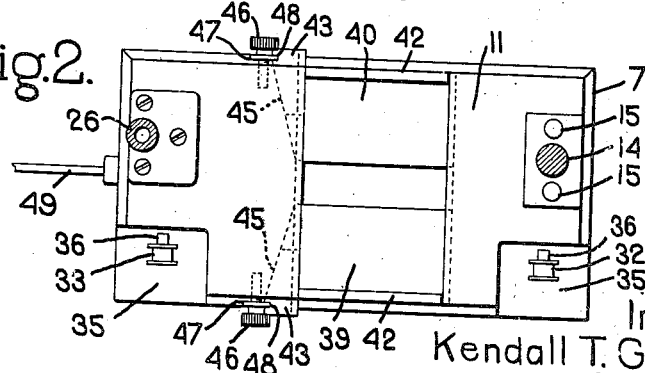
Inventor:
Kendall T. Greenwood
by Heard Smith & Tennant.
Attys.

Sept. 23, 1941.   K. T. GREENWOOD   2,256,899
REEL-SUPPORTING MEANS FOR MOTION PICTURE PROJECTORS
Filed Dec. 26, 1939   2 Sheets-Sheet 2
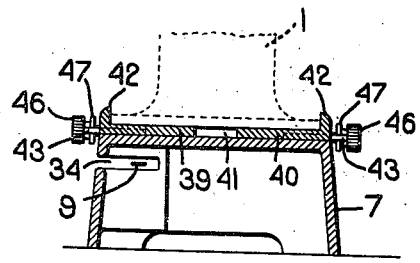
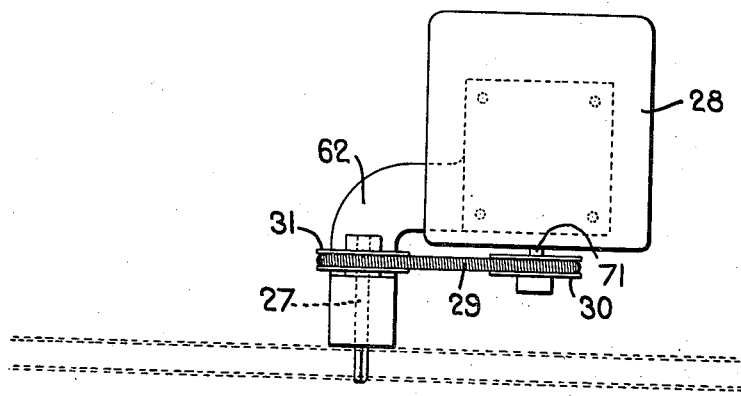
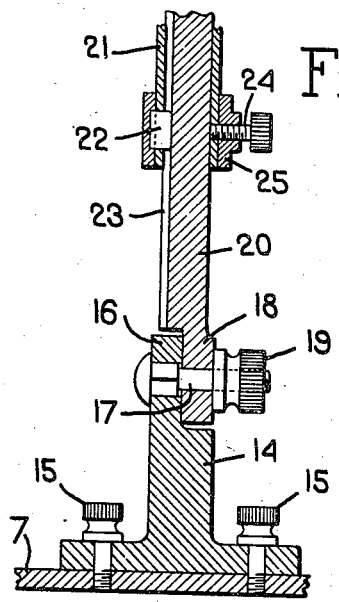
Inventor.
Kendall T. Greenwood
by Heard Smith & Tennant
Attys.

Patented Sept. 23, 1941

2,256,899

UNITED STATES PATENT OFFICE 2,256,899

REEL-SUPPORTING MEANS FOR MOTION PICTURE PROJECTORS

Kendall T. Greenwood, Sanford, Maine

Application December 26, 1939, Serial No. 310,874

6 Claims. (Cl. 242—55)

This invention relates to motion picture projecting apparatus and it has for its general object to provide a novel device in the nature of an accessory to a projector by means of which it is possible to use reels of a much larger capacity than that for which the projector is built.

Motion picture projectors using a 16 mm. film or an 8 mm. film are commonly made to accommodate reels of a limited capacity, a 400-foot reel usually being the maximum size of a reel which can be used on such projectors. This means that if a long picture is to be shown, that is, a picture which will run for three-quarters of an hour or an hour, it is necessary to divide the film between two or more reels. As a result, the showing of a picture of such length on a projector having a limited reel capacity involves changing of reels in the middle of the picture, an operation which is often disconcerting to the audience viewing the picture.

As stated above, it is one of the objects of my present invention to provide a novel device to be used in connection with a projector having a limited reel capacity and by means of which a reel of much larger capacity than that for which the projector is built can be shown continuously and without any interruption such as would be involved in changing reels.

My improvements comprise a suitable base adapted to support a motion picture projector and provided with means to support a large capacity reel in position to deliver the film to the film-feeding mechanism of the projector, and also provided with means for supporting and operating a large capacity take-up reel designed to receive the film from the projection apparatus, the means for operating the take-up reel being separate structurally from and independent of the projector.

The use of the device embodying my invention for showing a long picture continuously and without interruption does not involve any change in the structure of the projection apparatus, so that by means of my invention it is possible to show without interruption the picture on an 800-foot reel or a 1200-foot reel, or even a larger reel, with a motion picture projector which is built for a reel of maximum capacity of, say, 400 feet.

In order to give an understanding of the invention, I have illustrated herein a selected embodiment of the invention which will now be described, after which the novel features will be pointed out in the appended claims.

In the drawings:

Fig. 1 is a side view of a device embodying my invention, the motion picture projector itself being shown in dotted lines.

Fig. 2 is a section on the line 2—2, Fig. 1, showing the base in plan view.

Fig. 3 is a section on the line 3—3, Fig. 1.

Fig. 4 is a fragmentary view of the support for the take-up reel and the motor for operating the same.

Fig. 5 is an enlarged section on the line 5—5, Fig. 1.

In the drawings, there is shown in dotted lines at 1 a motion picture projector of any well-known make which is provided with the reel-supporting portion 2 having at its upper end a spindle 3 to receive the reel carrying the film to be shown and also having at its lower end a driven spindle 4 to receive the take-up reel. The projector 1 is also provided with the usual film-feeding means in the form of the driven sprocket wheels 5 and 6 together with means for giving the film its intermittent motion as it passes the lens.

My improvement comprises a base member or support 7 on which the projector 1 is adapted to be mounted, and this base or support 7 is provided with a reel support adapted to receive a reel 8 of large capacity and to deliver the film 9 from said reel to the film-feeding mechanism of the projector 1. Said base or support is also provided with means for mounting a take-up reel 10 of large capacity onto which the film 9 is wound after it has been fed through the projector, and with means separate from the projector 1 for operating the take-up reel 10.

The base 7 may have any suitable construction but it is provided with an upper surface 11 on which the projector 1 may rest, suitable means hereinafter described being provided for clamping the projector on the base. The large capacity reel 8 carrying the film 9 to be exhibited, is shown as mounted on a supporting arm 12 which rises from the front end of the base 7. This arm 12 is provided at its upper end with a spindle 13 to receive the reel, and said arm is preferably made adjustable as to its length and is also pivotally mounted so that it can be swung forwardly or backwardly. In the present embodiment of the invention, the arm is carried by a bracket 14 which is secured to the base 11 by means of suitable clamping screws 15. The lower end of the arm 12 is pivotally connected to the supporting bracket 14 by means of a friction pivotal mounting. The upper end of the bracket arm 14 is formed with the rounded portion 16 which carries a pivot screw 17 that extends through the rounded portion 18 on the lower end of the arm 12, said screw having a clamping nut 19 screw-threaded thereto. When the clamping nut is loosened, the arm 12 can be swung backwardly or forwardly, and by tightening the clamping nut 19, the two faces of the rounded parts 16 and 18 will be clamped together, thereby frictionally holding the arm 12 at any adjusted position. Said arm 12 is extensible as to its length and comprises the two telescopic sections 20 and 21, the section 20 telescoping into the section 21, and the latter having a key 22 operating in a keyway 23 in the section 20 so as to prevent one section from turning on the other. 24 is a set screw carried by a collar 25 on the lower end of the arm section 21, said screw providing means for locking the two arm sections 20 and 21 in any relative adjusted position. This arm 12 is so mounted on the base 7 that it will deliver its film 9 properly to the film feeding mechanism of the projector.

The large capacity take-up reel 10 is mounted on a post or support 26 rising from the base 7 in the rear of the projector 1, said post 26 carrying at its upper end a driven spindle 27 on which the take-up reel may be removably placed. This take-up reel 10 is driven by a motor 28 which is separate and independent from the projector 1, said motor being carried on the upper end of the post 26 and being connected to the spindle 27 by any suitable driving means.

As herein shown, the motor is provided with a shaft 71 which is connected to the spindle by means of an elastic belt 29 that passes around a driving pulley 30 on the shaft 71 and a driven pulley 31 carried by the spindle 27. The motor 28 will be provided with suitable reducing gear to provide a proper speed of rotation of the shaft 71.

Means are provided for guiding the film in its travelling movement from the projector 1 to the take-up reel 10, and in the construction illustrated, such guiding means comprises two guide rolls 32, 33 which are carried by the base and around which the film 9 passes. These guide rolls 32, 33 are located below the upper surface of the base and the latter is provided in one side with an open slot 34 (see Fig. 3) through which the film passes in its movement from the guide roll 32 to the guide roll 33. The base is formed with the two open recesses 35 in which the guide rolls 32 and 33 are located. Each guide roll is preferably yieldingly mounted and this may be provided for by rotatably mounting each roll on a supporting arm 36 which is pivotally mounted at 37 and is acted on by a suitable spring 38 that provides for a yielding movement of the roll.

While any suitable means for clamping the projector 1 on the base 7 may be employed, I have herein shown a clamping device comprising two clamping members 39, 40, which are slidably mounted in a dovetail recess 41 that extends across the top of the base 7. Each clamping member 39, 40 has at its outer edge an upstanding rib 42 adapted to engage the edge of the bottom or base of the projector 1. These clamping members 39, 40 can be moved toward and from each other, and will thus accommodate projectors of different sizes. While any suitable means may be employed for locking each clamping member in its adjusted position, I have herein shown for this purpose two locking wedges 43, one for each clamping member, said wedges operating in slots 44 that open at one side into the recess 41 in which the clamping members are received, the other side of each slot having the inclined face 45. When the clamping member is in adjusted position, an advancing movement of the corresponding wedge 43 locks the clamping member in such adjusted position. Conversely, a retracting movement of either wedge will release the clamping member so as to permit it to be adjusted in the recess 41.

For advancing or retracting the wedges 43, I have provided two actuating screws 46, one for each wedge, which are screw-threaded into the base, each screw having a flange 47 thereon which operates in a recess or notch 48 formed in the edge of the wedge. As the screws 46 are advanced or retracted, the engagement of the flanges 47 in the notches 48 will correspondingly advance or retract the wedges, thereby locking or unlocking the clamping member.

The base 7 is provided with control switches for controlling the operation of the projector 1, and the operation of the motor 28 for the take-up reel. Current is supplied to these switches through a suitable cable connection 49 and the switch for controlling the motor 28 for the take-up reel is indicated at 50. 51 indicates a separate switch which is connected by suitable cord or cable 52 to the usual terminal connection for the projector 1. The circuit wires in the cable 49 lead to the switches 50 and 51, and the construction is such that by operating the switch 51, the projector will be set in operation, and by operating the switch 50, the motor 28 for the take-up reel will be set in operation.

52 is a reversing switch connected in the circuit in a well-known way, and by means of which the motor 28 may be reversed when it is desired to rewind the film onto the reel 8. This is done according to the usual practice of placing the empty reel 8 on the spindle 27 and the filled take-up reel 10 on the spindle 13 and then operating the motor 28 through the reversing switch to rewind the film directly from the take-up reel 10 back onto the reel 8.

The manner in which the device is used will be obvious from the foregoing description. The projector 1 is placed on the base 7 and clamped in position, and the large capacity reel 8 containing the film to be exhibited is applied to the spindle 13 and the empty take-up reel is placed on the spindle 27. The film 9 from the reel 8 is then threaded through the film-feeding mechanism of the projector 1 as usual, and as illustrated in Fig. 1, and said film is passed around the guide roll 32 and threaded through the slot 34 and passed around the guide roll 33, and the end of the film is fastened to the take-up reel 10 in the usual manner. The operator then throws the switches 50 and 51, thereby setting both the projector 1 and the motor 28 for the take-up reel in operation. The motor 28 is designed to operate the take-up reel at the proper speed to wind the film thereon as fast as it is fed through the projector, the yieldingly mounted guide rolls 32, 33 providing sufficient yielding movement to prevent any breakage of the film. The driving means between the motor 28 and the take-up spindle 27 provides for the necessary slippage to occur so that the film will never be under too great a tension.

Because of the fact that the reels 8 and 10 are mounted independently of the projector, it is possible to use reels of a capacity as large as 1,600 feet, if necessary, and to run the picture on these reels continuously through a projector which was built to have a limited reel capacity.

I claim:

1. A motion picture projector accessory comprising a supporting base adapted to removably support a motion picture projector having the usual reel-supporting means, film-feeding mechanism and means to actuate the latter, means carried by the supporting base to support a supply reel in position to deliver its film to the film-feeding mechanism of such a projector supported on said base, means also carried by said base for supporting a take-up reel, both of said means being separate from the reel-supporting means of the projector and means separate from said projector and its film-feeding mechanism for rotating the take-up reel to wind the film thereon.

2. A motion picture projector accessory comprising a supporting base adapted to removably support a motion picture projector having the usual reel-supporting means, film-feeding mechanism and means for actuating the latter, means carried by the base to support a reel in position to deliver its film to the film-feeding mechanism of such a projector supported on said base, means also carried by said base for supporting a take-up reel at the rear of the projector on the base, both of said means being separate from the reel-supporting means of the projector and means separate from the projector and its film-feeding mechanism for rotating the take-up reel to wind the film thereon.

3. A motion picture projector accessory comprising a supporting base adapted to removably support a motion picture projector having the usual reel-supporting means, film-feeding mechanism and means for actuating the latter, means carried by the base to support a reel in position to deliver its film to the film-feeding mechanism of said projector, an arm carried by said base in the rear of the projector mounted thereon for supporting a take-up reel, means mounted on said arm and separate from said projector for rotating the take-up reel to wind the film thereon, and yieldingly mounted guide rolls carried by the base and serving to guide the film in its travelling movement from the projector to the take-up roll.

4. A device of the class described comprising a supporting base adapted to removably support a motion picture projector, means on the base for clamping the projector thereto, an upstanding reel-supporting arm at the front of the base and adapted to support a reel in position to deliver its film to the film feeding mechanism of a projector mounted on the base, a second upstanding arm at the rear of the base, a spindle for a take-up reel mounted on said second arm, and a motor mounted on said second arm and separate from the projector for operating said take-up spindle.

5. A device of the class described comprising a supporting base adapted to removably support a motion picture projector having the usual reel-supporting portion and the usual film-feeding mechanism and means to actuate it, means on the base for clamping the projector thereto, an upstanding reel-supporting arm at the front of the base and adapted to support a supply reel in position to deliver its film to the film-feeding mechanism of a projector mounted on the base, a second upstanding arm at the rear of the base, both of said arms being separate from the reel-supporting portion of the projector, a spindle for a take-up reel mounted on said second arm, and a motor mounted on said second arm for driving the take-up spindle, said motor being separate and independent from the film-feeding means and its actuating mechanism.

6. A device of the class described comprising a supporting base adapted to removably support a motion picture projector having the usual reel-supporting portion to hold a supply reel and a take-up reel, and also having the usual film-feeding mechanism and means to actuate it, means on the base for clamping the projector thereto, an upstanding reel-supporting arm at the front of the base separate from the reel-supporting portion of the projector and adapted to support a supply reel in position to deliver its film to the film-feeding mechanism of such a projector mounted on the base, and a second upstanding arm at the rear of the base also separate from the film-supporting portion of said projector, a spindle for a take-up reel mounted on said second arm, a motor also mounted on said second arm for driving the take-up spindle, said motor being separate and independent from the film-feeding mechanism of the projector, said base having a film-receiving passage extending from the front to the back thereof below the portion on which the projector is mounted, and through which passage the film moves in travelling from the supply reel to the take-up reel, and yieldingly mounted guide rolls carried by the base and serving to guide the film while moving through said passage.

KENDALL T. GREENWOOD.